US011862889B2

(12) United States Patent
Davidsz et al.

(10) Patent No.: US 11,862,889 B2
(45) Date of Patent: Jan. 2, 2024

(54) SYSTEMS AND METHODS FOR A CABLE CONNECTOR

(71) Applicant: ROCKWELL AUTOMATION TECHNOLOGIES, INC., Mayfield Heights, OH (US)

(72) Inventors: Mark E. Davidsz, Oak Creek, WI (US); Michael S. Baran, Milwaukee, WI (US); Shravan Rajmohan, Bengaluru (IN); Douglas J. Carpiaux, Milwaukee, WI (US); Scott H. Micoley, Plymouth, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 8 days.

(21) Appl. No.: 17/171,892

(22) Filed: Feb. 9, 2021

(65) Prior Publication Data

US 2022/0255257 A1 Aug. 11, 2022

(51) Int. Cl.

| | |
|---|---|
| ***H01R 13/506*** | (2006.01) |
| ***H01R 12/62*** | (2011.01) |
| ***H01R 12/67*** | (2011.01) |

(52) U.S. Cl.

CPC ........... *H01R 13/506* (2013.01); *H01R 12/62* (2013.01); *H01R 12/675* (2013.01)

(58) Field of Classification Search

None

See application file for complete search history.

(56) References Cited

U.S. PATENT DOCUMENTS

| | | | | |
|---|---|---|---|---|
| 4,020,540 A | | 5/1977 | Casciotti et al. | |
| 4,209,219 A | | 6/1980 | Proietto | |
| 4,252,396 A | | 2/1981 | Wilson | |
| 4,255,009 A | | 3/1981 | Clark | |
| 4,460,228 A | | 7/1984 | Lane et al. | |
| 4,538,873 A | | 9/1985 | Worth | |
| 4,655,528 A | | 4/1987 | Groft | |
| 4,668,039 A | * | 5/1987 | Marzili ................ | H01R 4/2433 439/404 |

(Continued)

FOREIGN PATENT DOCUMENTS

| | | |
|---|---|---|
| CN | 103140707 A | 6/2013 |
| DE | 3314071 A1 | 10/1984 |

(Continued)

OTHER PUBLICATIONS

European Patent Office, Extended Search Report, Application No. 22152227.9, dated Jun. 27, 2022, 9 pages.

(Continued)

*Primary Examiner* — Oscar C Jimenez

(74) *Attorney, Agent, or Firm* — Quarles & Brady LLP

(57) ABSTRACT

A connector for receiving a ribbon cable is provided. The connector includes a housing including an open top and a guide wall including a track and a cable organizer configured to be positioned within an interior of the housing and the open top and to receive the ribbon cable along a surface thereof. The connector also includes a cover configured to selectively cover the open top of the housing to enclose the cable organizer within the interior of the housing. The cover includes a rib configured to slide along the track so that the cover moves relative to the housing along a linear trajectory.

15 Claims, 10 Drawing Sheets

(56) References Cited

U.S. PATENT DOCUMENTS

| | | | | | |
|---|---|---|---|---|---|
| 4,824,384 | A | 4/1989 | Nicholas et al. | | |
| 4,891,019 | A * | 1/1990 | Olsson | H01R 12/79 | 439/404 |
| 4,911,210 | A | 3/1990 | Hillegonds | | |
| 4,940,430 | A | 7/1990 | Fujitani et al. | | |
| 5,059,137 | A | 10/1991 | Dale et al. | | |
| 5,456,617 | A | 10/1995 | Chishima et al. | | |
| 5,465,479 | A | 11/1995 | Bowen et al. | | |
| 5,498,172 | A | 3/1996 | Noda | | |
| 5,934,930 | A * | 8/1999 | Camps | H01R 12/61 | 439/425 |
| 6,036,531 | A * | 3/2000 | Lee | H01R 12/675 | 439/459 |
| 6,232,557 | B1 | 5/2001 | Lounsbury et al. | | |
| 7,007,346 | B2 | 3/2006 | Hoffman | | |
| 7,070,443 | B2 * | 7/2006 | Tashiro | F21V 21/002 | 439/404 |
| 7,156,686 | B1 * | 1/2007 | Sekela | H01R 12/675 | 439/417 |
| 7,354,310 | B1 | 4/2008 | Brown | | |
| 8,723,044 | B2 | 5/2014 | Onodi | | |
| 9,698,498 | B1 | 7/2017 | Wang et al. | | |
| 9,728,864 | B2 | 8/2017 | Mathews et al. | | |
| 9,954,296 | B2 | 4/2018 | Haensgen et al. | | |
| 10,476,179 | B2 * | 11/2019 | Hayashi | H01R 4/2433 | |
| 11,189,954 | B2 | 11/2021 | Kwon et al. | | |
| 11,251,550 | B1 * | 2/2022 | Davidsz | H01R 12/675 | |
| 11,322,867 | B1 | 5/2022 | Davidsz et al. | | |
| 2002/0016104 | A1 * | 2/2002 | Maegawa | H01R 12/61 | 439/502 |
| 2004/0235335 | A1 | 11/2004 | Schoeffel et al. | | |
| 2005/0070147 | A1 | 3/2005 | Hung | | |
| 2006/0183360 | A1 | 8/2006 | Nave et al. | | |
| 2008/0076295 | A1 * | 3/2008 | Lappoehn | H01R 12/675 | 439/460 |
| 2008/0153346 | A1 * | 6/2008 | Oesterhaus | H01R 25/142 | 439/499 |
| 2018/0013220 | A1 | 1/2018 | Haensgen et al. | | |

FOREIGN PATENT DOCUMENTS

| | | | |
|---|---|---|---|
| EP | 0602539 | A2 | 6/1994 |
| EP | 2600470 | A1 | 6/2013 |
| EP | 1983616 | B1 | 10/2015 |
| JP | S5798695 | U | 6/1982 |
| JP | H0474889 | U | 6/1992 |
| JP | 2938780 | B2 | 8/1999 |

OTHER PUBLICATIONS

European Patent Office, Extended Search Report, Application No. 22152017.4, dated Jul. 8, 2022, 13 pages.

European Patent Office, Extended Search Report, Application No. 22188073.5, dated May 26, 2023, 13 pages.

* cited by examiner

SYSTEMS AND METHODS FOR A CABLE CONNECTOR

CROSS-REFERENCES TO RELATED APPLICATIONS

Not applicable.

STATEMENT REGARDING FEDERALLY SPONSORED RESEARCH

Not applicable.

BACKGROUND INFORMATION

The subject matter disclosed within relates generally to connectors. In particular, the subject matter relates to connectors for ribbon cables such as, but not limited to, those used in conjunction with network transmission media of the type used in industrial control, monitoring, and similar power and data network systems.

BRIEF DESCRIPTION

In one embodiment, a connector for receiving a ribbon cable is provided. The connector includes a housing, a cable organizer, and a cover. The housing includes an open top and a guide wall including a track. The cable organizer is configured to be positioned within an interior of the housing and the open top and to receive the ribbon cable. The cover is configured to selectively cover the open top of the housing to enclose the cable organizer within the interior of the housing. The cover includes a rib configured to slide along the track so that the cover moves relative to the housing along a linear trajectory.

In one embodiment, a method of installing a ribbon cable on a connector is provided. The method includes linearly sliding a cover of the connector away from a housing of the connector to create a cable access pathway to an open top of the housing, and aligning the ribbon cable on a cable organizer positioned within the open top of the housing. The method also includes linearly sliding the cover toward the housing to entrap the ribbon cable within the housing between the cover and the cable organizer.

The foregoing and other aspects and advantages of the present disclosure will appear from the following description. In the description, reference is made to the accompanying drawings which form a part hereof, and in which there is shown by way of illustrations one or more embodiments of the present disclosure. Such embodiments do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

DETAILED DESCRIPTION

Figure 1:
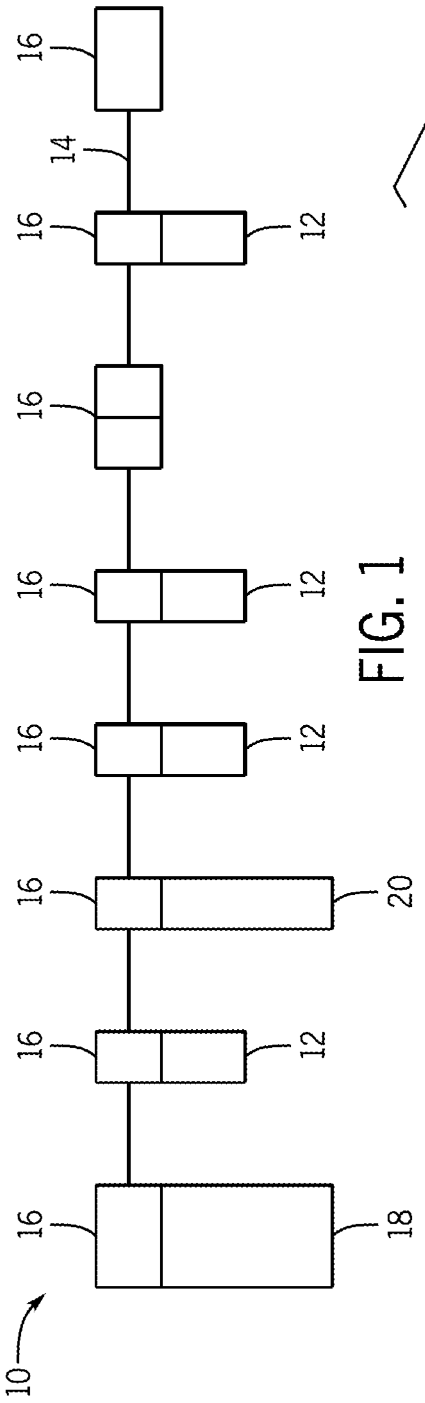
FIG. 1 is a schematic view of a data and power network.

Before any embodiments of the invention are explained in detail, it is to be understood that the embodiments are not limited in its application to the details of construction and the arrangement of components set forth in the following description or illustrated in the following drawings. Aspects of the present disclosure are capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the present disclosure. Various modifications to the illustrated embodiments will be readily apparent to those skilled in the art, and the generic principles herein can be applied to other embodiments and applications without departing from embodiments of the present disclosure. Thus, embodiments of the present disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the present disclosure. Skilled artisans will recognize the examples provided herein have many useful alternatives and fall within the scope of embodiments of the present disclosure.

Disclosed herein is a connector for positioning and locating a flat, ribbon-style cable. The connector may be used in conjunction with such a ribbon cable for use in industrial control, monitoring, and similar power and data network systems, for example, as a node or power connection for a device within the system, passing data and/or power between the ribbon cable and the device, or a termination or splicer for cables within the system. The connectors for various purposes (e.g., power connection, node connection, termination, splicing) can incorporate one or more universal parts, enabling easy assembly of the network with common tooling for all connectors and re-use of certain components for different purposes. Some embodiments of a connector incorporate a cover configured to be coupled to a housing, where the cover is moved along a linear trajectory.

By way of example, FIG. 1 schematically illustrates a data and power network 10. The network 10 includes a plurality of device nodes 12 coupled to one another via a network ribbon cable 14. Each device node 12 can receive power and/or data signals from the ribbon cable 14 via a connector 16. More specifically, once coupled to the ribbon cable 14 via a respective connector 16, each device node 12 can transmit and receive control and data signals via the ribbon cable 14 in accordance with various standard protocols in addition to receiving various forms of electrical power. Various examples of device nodes 12 may include, but are not limited to, devices such as push-button switches, motor starters, proximity sensors, flow sensors, speed sensors, actuating solenoids, electrical relays, and electrical contactors.

Additionally, electrical power can be provided to the network 10 via one or more intelligent power taps 18. For example, intelligent power taps 18 can be intelligent devices having the ability to interact with the control and data signals of the network 10, in addition to providing various forms of power. The intelligent power taps 18 can provide power (e.g., in the form of 24 volts DC) to the network 10 by connecting to the ribbon cable 14 via a connector 16. In addition to, or as an alternative to, one or more of the intelligent power taps 18, the network 10 can include one or more non-intelligent power taps 20 connected to the ribbon cable 14 via a connector 16. For example, a non-intelligent power tap 20 may only provide power to the network 10, without interacting with control and data signals. At one or both ends of ribbon cable 14, a connector 16 can further be provided in the form of a terminator for capping the ribbon cable ends and terminating the signal conductors of the ribbon cable 14. Furthermore, within the network 10, one or more connectors 16 can be provided in the form of splicers to electrically connect and cap respective ends of two ribbon cables 14.

Figure 1A:
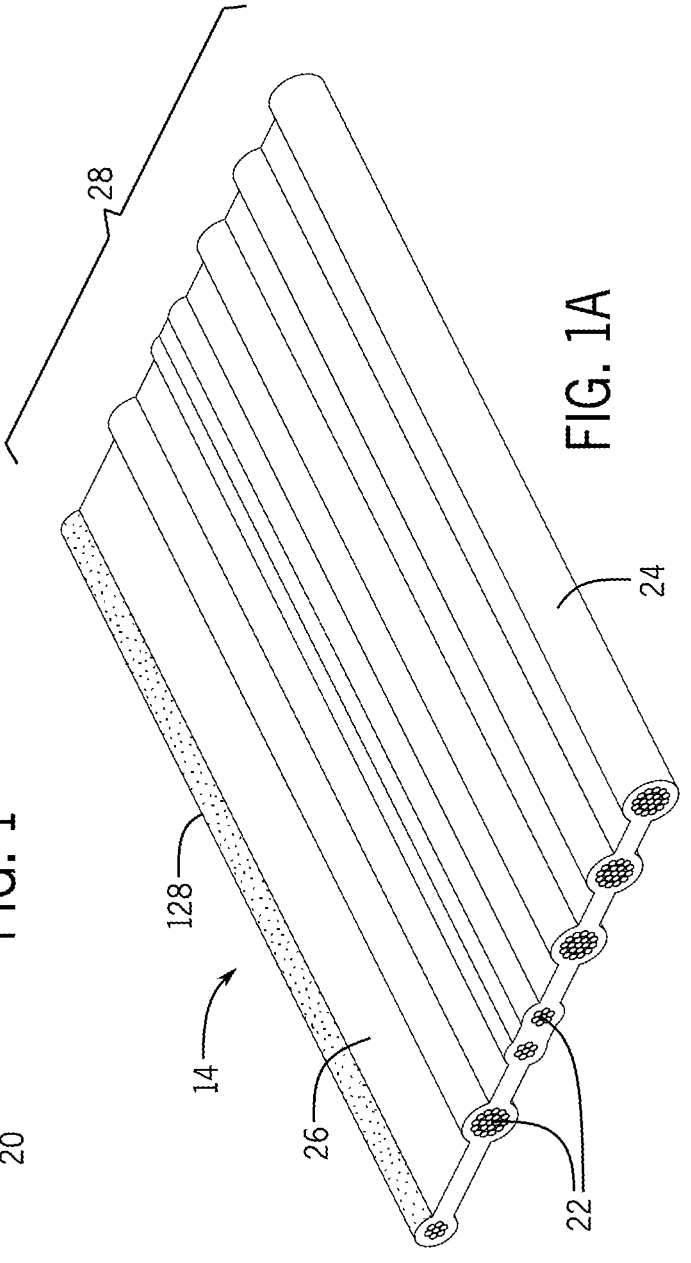
FIG. 1A is a perspective view of a multi-conductor ribbon cable.

As shown in FIG. 1A, a ribbon cable 14 for use in such a network 10 can include a plurality of parallel conductors 22 enclosed in a common insulation jacket 24. The conductors 22 can comprise a conductive material such as, but not limited to, copper or another conductive metal. The insulation jacket 24 can comprise an electrical insulating material such as, but not limited to, a plastic material. The insulation jacket 24 can sit on the conductors 22, e.g., as an extruded integral insulation, so that a cylindrical outer contour on the top and bottom of the ribbon cable 14 emerges, separated by flat insulation webbing 26 between conductors. In this manner, the ribbon cable 14 can define a ribbon profile 28 of curved, longitudinal tracks on top and bottom surfaces thereof. In some applications, all conductors 22 may be identical in size and equally spaced apart, forming a symmetrical ribbon profile 28; however, in other applications, the conductors 22 may differ in size and/or spacing, creating a varied or asymmetrical ribbon profile 28. According to the non-limiting example of FIG. 1A, the ribbon cable 14 includes seven extruded conductors 22 of various sizes, including four conductors 22 dedicated to power and three conductors 22 dedicated to data transfer, forming an asymmetrical ribbon profile 28.

Figure 9:
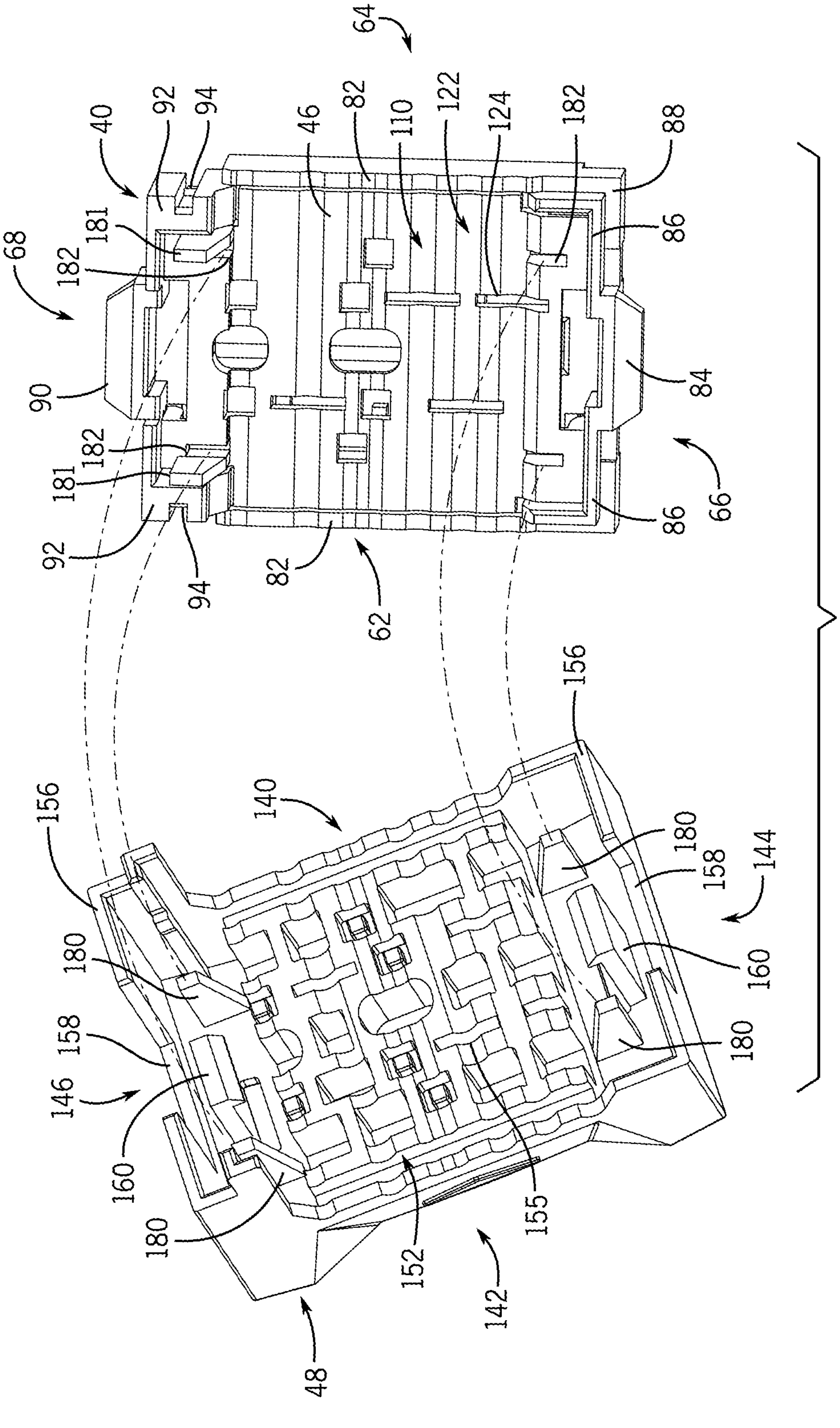
FIG. 9 is an isometric open view of a node connector, according to some embodiments.
Figure 10A:
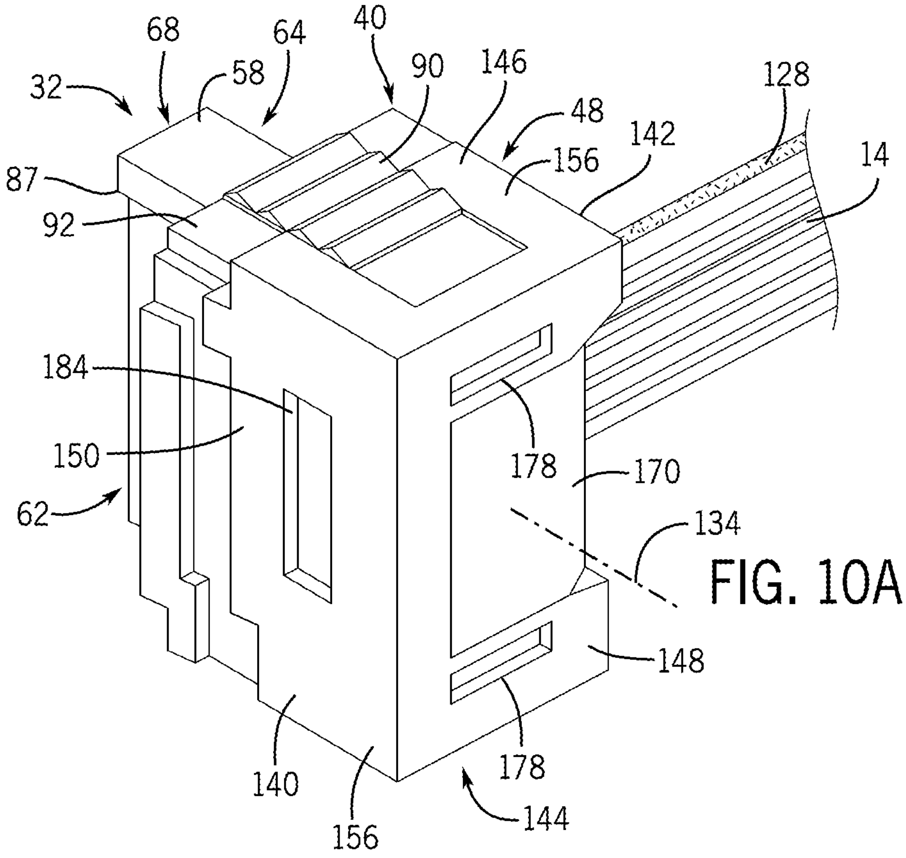
FIG. 10A is a perspective view of the power tap left connector of FIG. 10A, in a preassembled state.
Figure 10B:
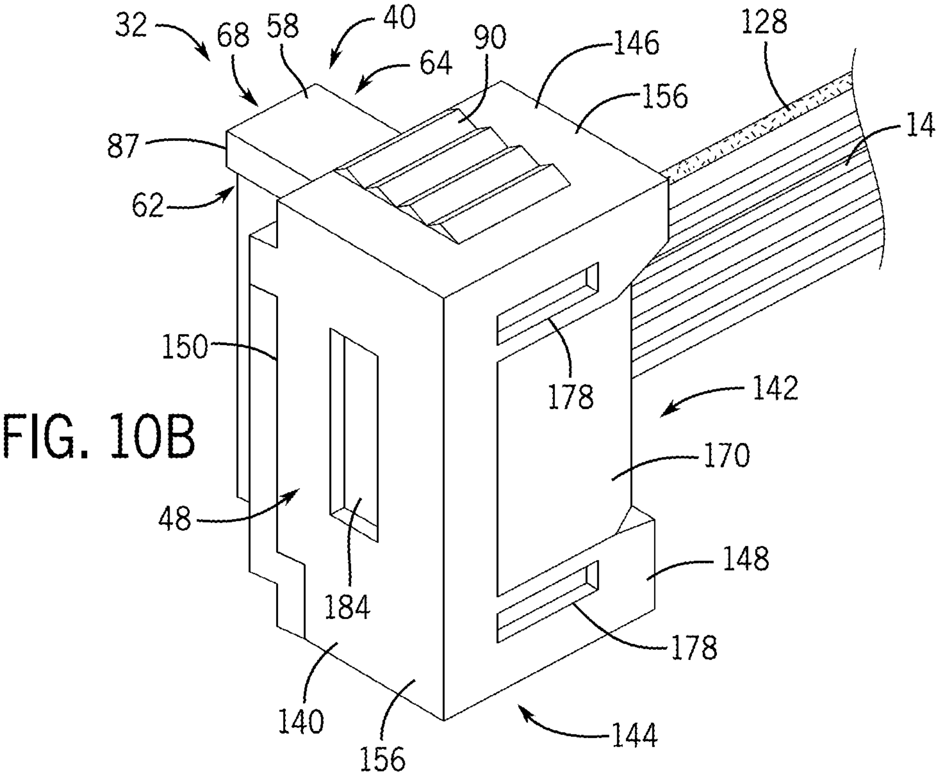
FIG. 10B is a perspective view of a power tap left connector, according to some embodiments, in an assembled state.

In some embodiments, each connector 16 can be configured to be coupled to and guide the ribbon cable 14 to maintain power and data connections within the network 10. As such, all connectors 16 within the network 10 can include generally similar components, with some components and features being universal across all connectors 16, and other components and features being specific to a connector 16 to achieve particular physical and/or electrical connections within the network 10. For example, connectors, according to some embodiments, for use in a network, can include, but are not limited to: a node connector 30, as shown in FIGS. 2-5, 7, and 9, configured to couple a ribbon cable 14 to a device node; a power tap left connector 32, as shown in FIGS. 10A and 10B, configured to couple a ribbon cable 14 to a power tap to direct power in a first direction; a power tap right connector configured to couple a ribbon cable 14 to a power tap to direct power in a second direction; a terminator configured to terminate a ribbon cable 14; and a splicer configured to splice together two ribbon cables 14. Generally, each connector can include at least a housing 40, a cable organizer 46, and a cover 48, as further described below. Furthermore, at least each of the node connector 30, the power tap left connector 32, the power tap right connector, and the splicer can include a printed circuit board 44, as further described below.

Figure 2:
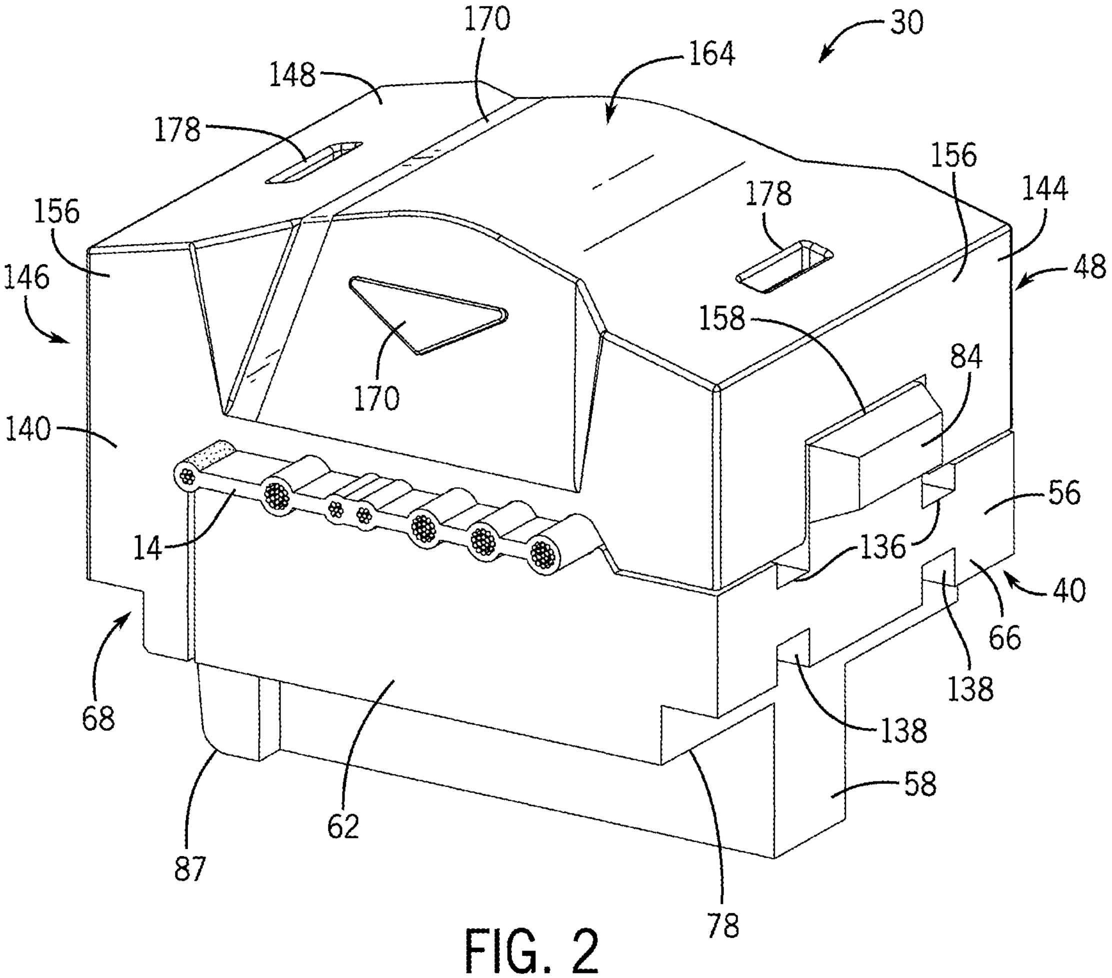
FIG. 2 is a perspective view of a node connector, according to some embodiments, in an assembled state.
Figure 3:
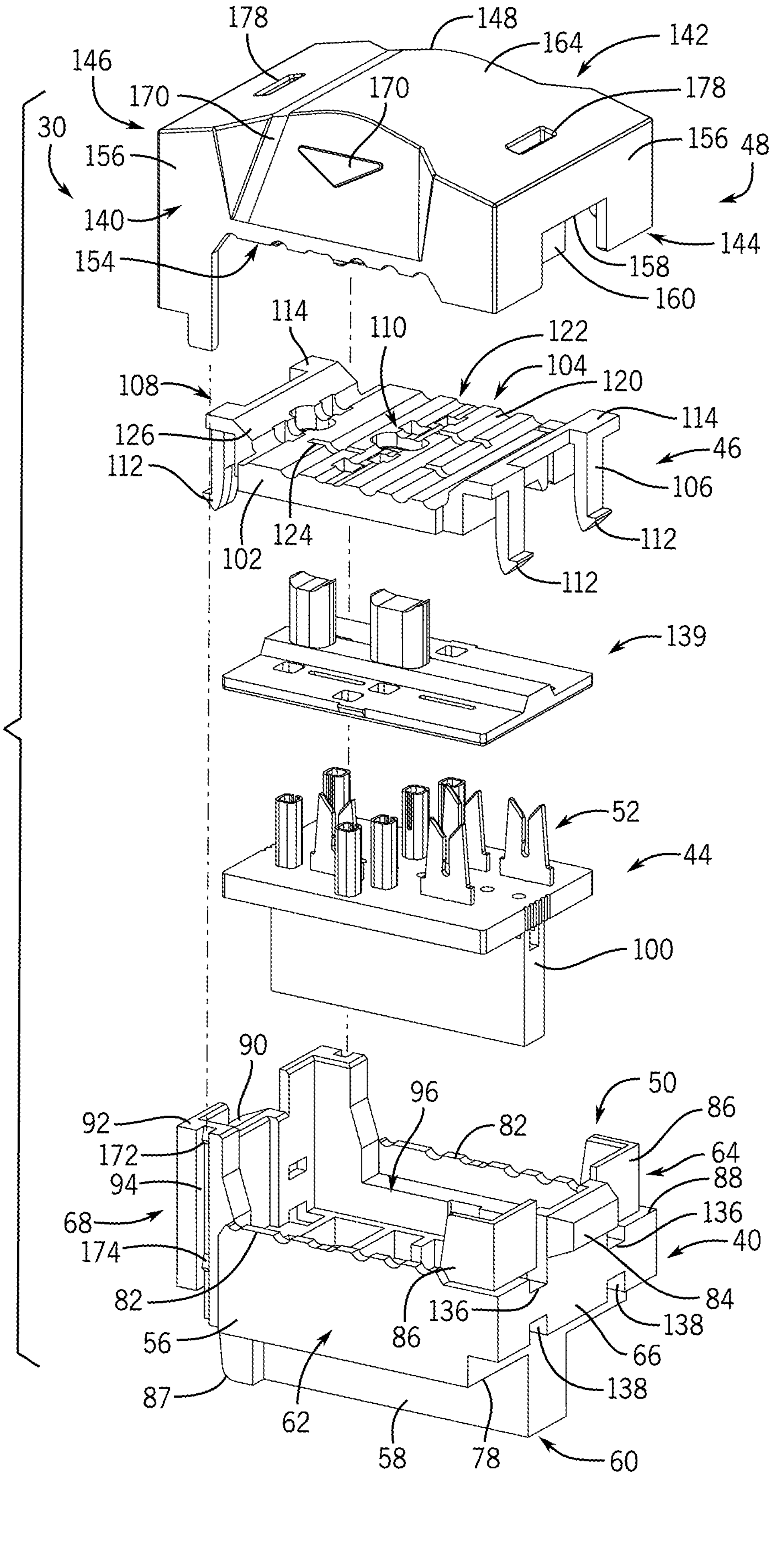
FIG. 3 is a perspective exploded view of the node connector of FIG. 2.
Figure 4:
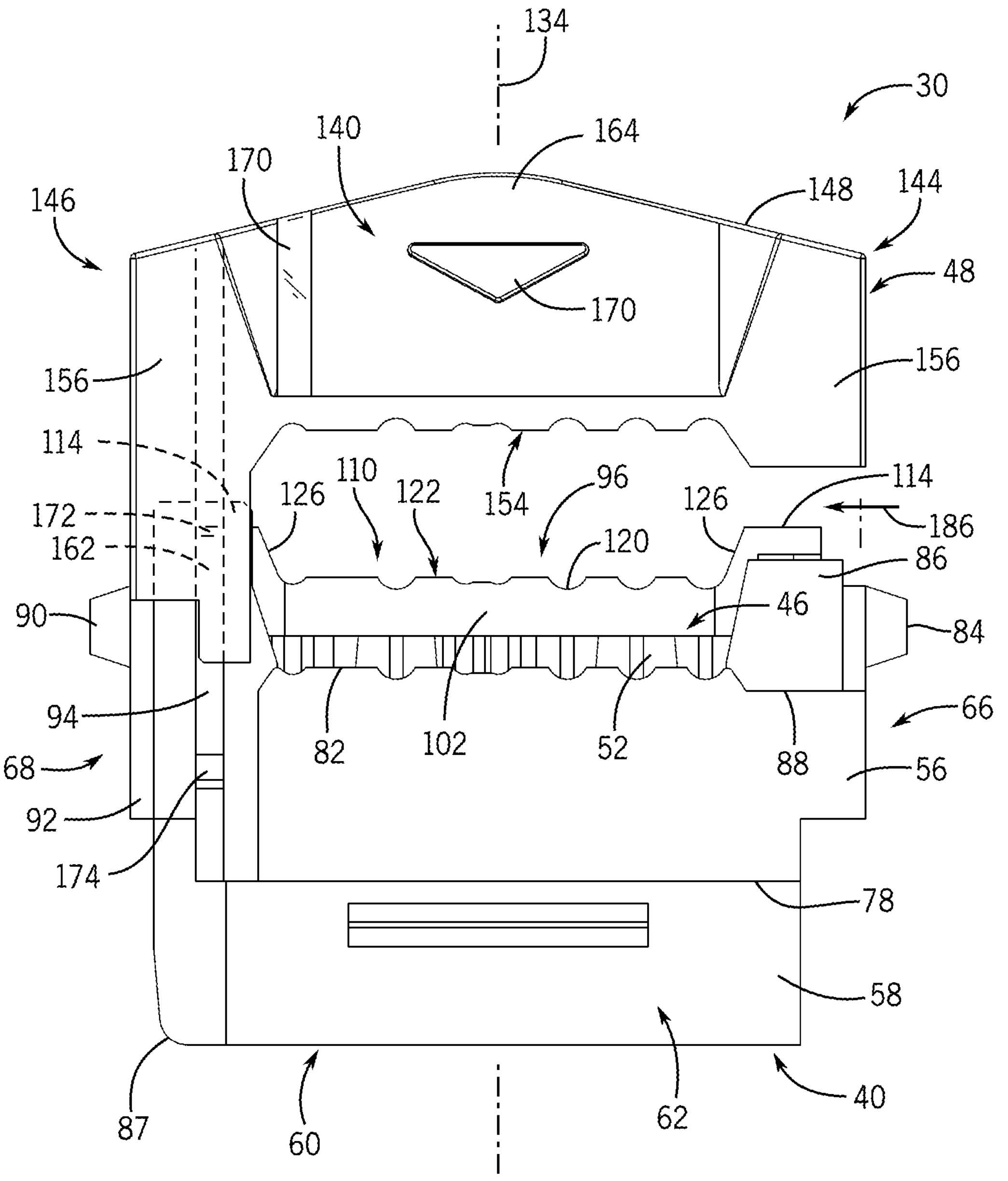
FIG. 4 is a side view of the node connector of FIG. 2 in a preassembled state.
Figure 5:
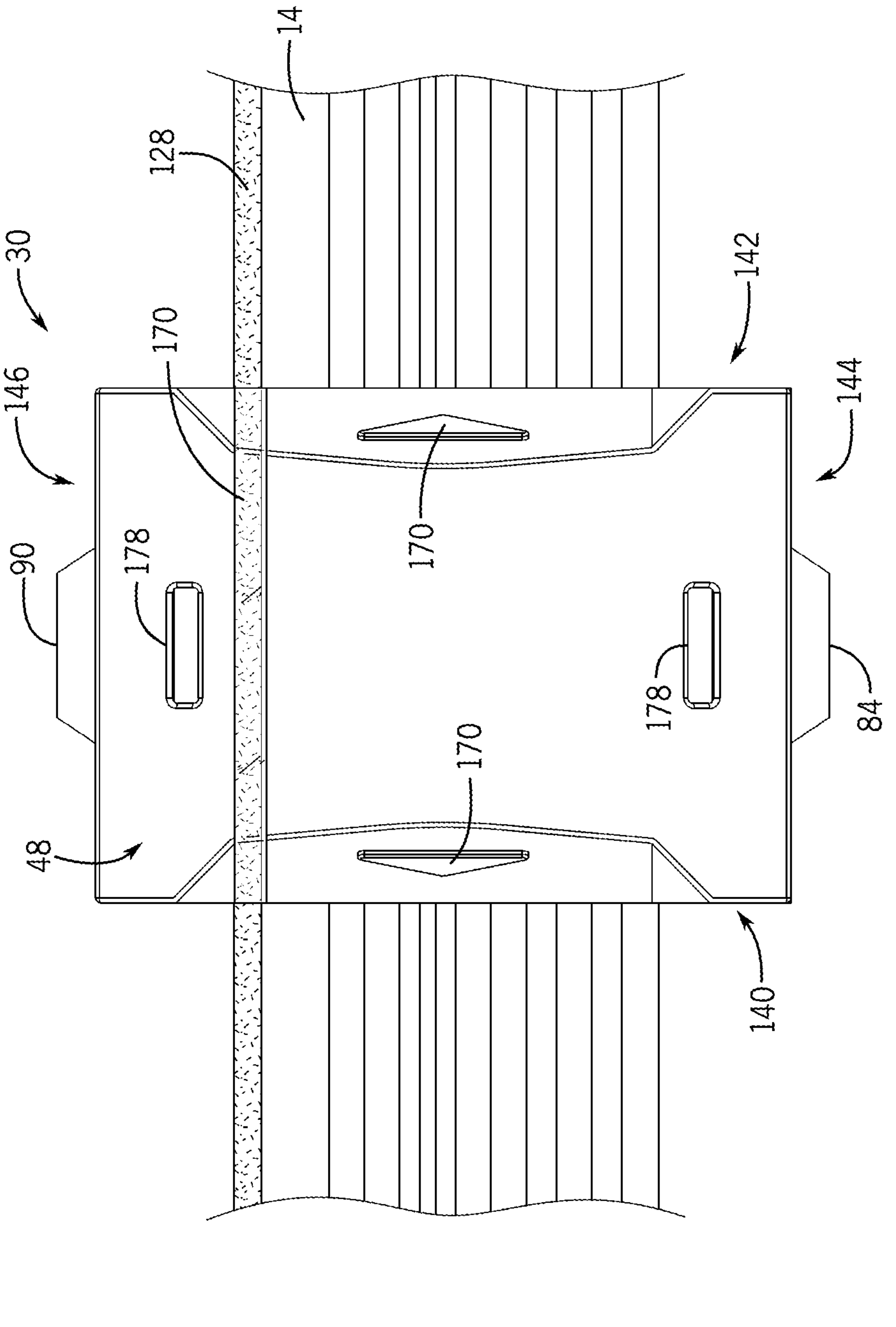
FIG. 5 is a top view of the node connector of FIG. 2 in an assembled state.
Figure 7:
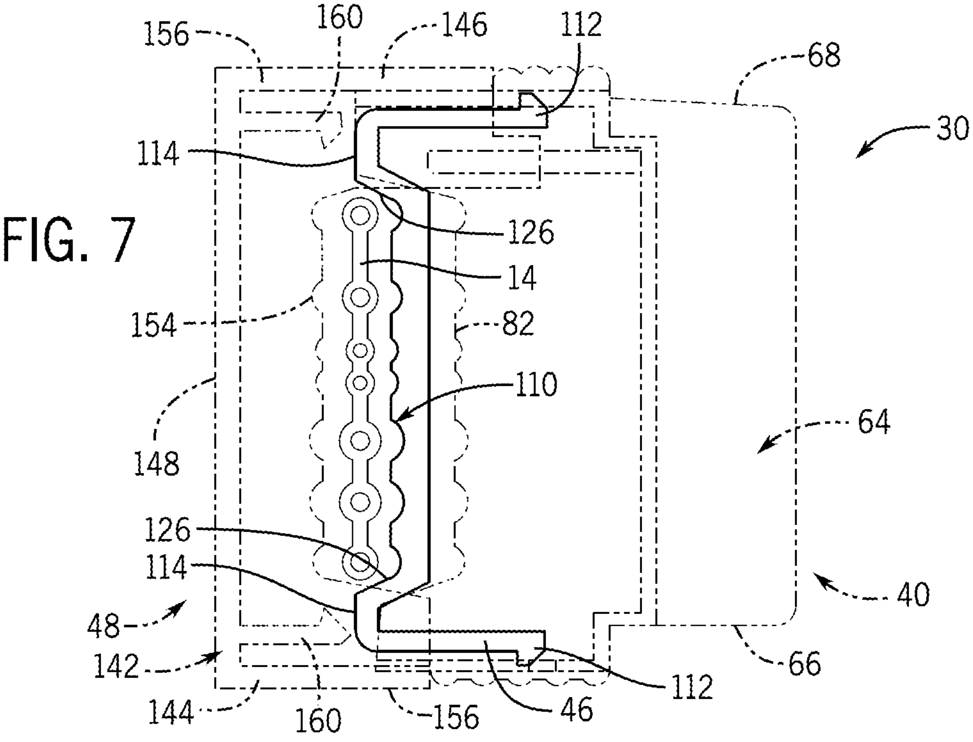
FIG. 7 is a side view of a node connector, according to some embodiments, in a preassembled state.

By way of example, referring to FIGS. 2-5 and 7, a node connector 30, according to some embodiments, is illustrated. The node connector 30 can include a housing 40, a removable protection cap 42 (shown in FIG. 11), a printed circuit board 44, a cable organizer 46, and a cover 48. Generally, a ribbon cable 14 can be positioned within (e.g., extend across) an open top 50 of the housing 40 and be supported by the cable organizer 46, as shown in FIG. 7. The ribbon cable 14 can be enclosed within the housing 40 by the cover 48 when the node connector 30 is in an assembled state, as shown in FIGS. 2 and 5. When enclosed within the housing 40, individual conductors 22 of the ribbon cable 14 can engage one or more conductor contacts 52 (such as insulation-displacement contacts (IDCs) and/or insulation-piercing contacts (IPCs)) extending from the printed circuit board 44. The housing 40 can be further adapted to plug into a corresponding jack on a device node to electrically and physically connect the ribbon cable 14 to the device node.

More specifically, with respect to the housing 40, in some embodiments, the housing 40 can support and enclose the printed circuit board 44 and the cable organizer 46 therein, and can be coupled to the cover 48 in a manner so that open top 50 of the housing 40 can be selectively covered by the cover 48, as further described below. The housing 40 can be generally rectangular in shape and can include an upper section 56 and a lower section 58, an open top 50 (e.g., at the upper section 56) and an open bottom 60 (e.g., at the lower section 58), a first side 62, a second side 64, a first end 66, and a second end 68. As shown in FIG. 5, when a ribbon cable 14 is positioned in the housing 40, the ribbon cable 14 extends out of the connector 30 from both sides 62, 64.

The upper section 56 of the housing 40 can define the open top 50. In some embodiments, as shown in FIG. 3, the first side 62 and the second side 64 can each include a lowered edge with a profile 82 configured to permit a ribbon cable 14 to extend out from the first side 62 and the second side 64 of the housing 40, respectively, when the ribbon cable 14 is coupled to the node connector 30. For example, as described above with respect to FIG. 1A, a ribbon cable 14 can include a ribbon profile 28 defined by outer contours of the insulated conductors 22 of the ribbon cable 14. The first side 62 and the second side 64 can therefore each include an inverse ribbon profile 82 that substantially corresponds to the ribbon profile 28 of a ribbon cable 14, allowing the ribbon cable 14 to sit within the profile 82. As a result, the housing 40 can facilitate and maintain proper alignment of the ribbon cable 14 within the housing 40 when the ribbon cable 14 is coupled to the node connector 30.

Furthermore, along the first end 66, the upper section 56 of the housing 40 can include an outwardly extending knob 84 and inwardly extending guide walls 86, as shown in FIG. 3. The guide walls 86 can be internally offset from an outer surface of the first end 66, creating a shoulder 88. Also, the guide walls 86 can extend around to the first side 62 and the second side 64 until reaching the profiled edges 82.

Along the second end 68, the upper section 56 of the housing 40 can also include an outwardly extending knob 90 and inwardly extending guide walls 92. In some embodiments, the guide walls 86 can be internally offset from the knob 90 and can extend higher than the guide walls 86 along the first end 66. Also, the guide walls 92 can extend around to the first side 62 and the second side 64 until reaching the profiled edges 82. As shown in FIG. 3, along the first side and the second side 62, 64, each guide wall 92 can include a track 94. As further described below, the guide walls 92 and, more specifically, the tracks 94, can support linear translation of the cover 48 relative to the housing 40.

In some embodiments, as shown in FIGS. 2-4, the lower section 58 of the housing 40 can be integral with the upper section 56, though smaller than the upper section 56. The lower section 58 can be dimensioned to define the open bottom 60 and also to plug into a node jack of a device node, i.e., so that the housing 40 can be plugged into the node jack, thus physically and electrically coupling the ribbon cable 14 to the device node via the node connector 30. In some embodiments, to facilitate proper directional (e.g., right-left) alignment of the connector 30 with a node jack, the lower section 58 can be longer on the second end 68 than the first end 66 to define a corner extension 87. Accordingly, the lower section 58 can include a generally rectangular profile with the corner extension 87, which matches a corresponding rectangular opening and corner extension of the node jack (not shown) in order to plug the connector 30 into the node jack.

Figure 11:
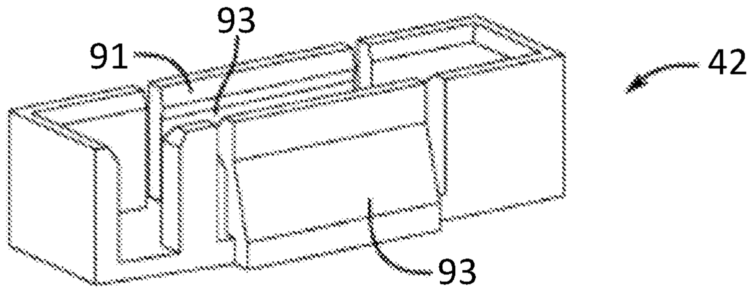
FIG. 11 is a perspective view of a protection cap according to some embodiments.

Furthermore, in some embodiments, the lower section 58 of the housing 40 can be selectively covered by a protection cap 42 in order to cover the open bottom 60. For example, the protection cap 42 can protect an interior of the housing 40 from outside elements when the connector 30 is not connected to a device node and can protect components within the interior of the housing 40 (such as the printed circuit board 44) from tooling when the connector 30 is placed in its assembled state, as further described below. An example protection cap is shown in FIG. 11 and described and further illustrated in U.S. patent application Ser. No. 17/114,203, filed Dec. 7, 2020, the entire contents of which is incorporated herein by reference. As shown in FIG. 11, the protection cap 42 can include pivotable latches 93 with the detents 91 adjacent inner, top ends thereof to couple the protection cap 42 to the lower section 58 of the housing 40.

As shown in FIG. 3, the upper and lower sections 56, 58 of the housing 40 can define an interior space 96 that houses the printed circuit board 44. More specifically, in some embodiments, the printed circuit board 44, such as a printed circuit board assembly, can sit within the housing 40 and can include, extending from an upper end thereof, one or more individual and distinct conductor contacts 52, each of which are separately soldered or pressed-in to the printed circuit board 44 with a mechanical and electrical connection, sufficient to connect the printed board circuits to the various individual conductors 22 of the ribbon cable 14. For example, in some embodiments, the conductor contacts 52 can include one or more insulation-displacement contacts (IDCs) and/or one or more insulation-piercing contacts (IPCs).

In some embodiments, the printed circuit board 44 and the conductor contacts 52 are positioned within the upper section 56 of the housing 40. For example, the upper section 56 can include a bottom seat 78 defined by an inward-stepped portion that connects that upper section 56 to the lower section 58, and the bottom seat 78 can support the printed circuit board 44 within the upper section 56. In some embodiments, the printed circuit board 44 can extend within the interior space 96 across the upper section 56 to define open areas between respective ends of the printed circuit board 44 and the first and second ends 66, 68 of the housing 40. As further described below, lower detents 112 of the cable organizer and/or portions of the cover 48 can extend into the open areas.

The conductor contacts 52 can be located along the printed circuit board 44 so that they can be configured to electrically contact individual conductors 22 of a ribbon cable 14 when the connector 30 is in its assembled state, as further described below. The printed circuit board 44 further includes, extending from a lower end thereof into the lower section 58 of the housing 40, a connector socket receptacle 100 electrically coupled to the conductor contacts 52 and accessible via the open bottom 60 of the housing 40. For example, the connector socket receptacle 100 can be adapted to plug into a corresponding node jack on a device node to electrically and physically connect the ribbon cable to the device node when the lower section 58 of the housing 40 is plugged into the node jack.

To facilitate proper connections between the conductor contacts 52 and respective conductors 22 of a ribbon cable 14, the cable organizer 46 can be configured to maintain a position of the ribbon cable 14 within the connector 30. More specifically, still referring to FIGS. 2-6, the cable organizer 46 can sit within and be supported by the housing 40, and positioned over top of the printed circuit board 44 so that it accessible via the open top 50 of the housing 40. The cable organizer 46 can include a first side 102, a second side 104, a first end 106, and a second end 108 that generally align with the first side 62, the second side 64, the first end 66, and the second end 68, respectively, of the housing 40. The cable organizer 46 can also include a generally flat surface 110 between two raised end surfaces 114, with one or more lower detents 112 that extend generally downward from the end surfaces 114 (e.g., along corners of the cable organizer 46 or at other positions along the sides 102, 104 or ends 106, 108).

In some embodiments, the cable organizer 46 can include a plurality of longitudinal grooves or guideways 120 in the flat surface 110 extending from the first side 102 to the second side 104 thereof and configured to receive insulated conductors 22 of a ribbon cable 14. For example, as described above, a ribbon cable 14 includes a ribbon profile 28 defined by outer contours of the insulated conductors 22. The longitudinal guideways 120 of the cable organizer 46 can define an inverse ribbon profile 122 that substantially corresponds to the ribbon profile 28 of the ribbon cable 14 (e.g., matching the inverse ribbon profiles 82 on the first and second sides 62, 64 of the housing 40), thus permitting proper alignment of individual conductors 22 of the ribbon cable 14 within the connector 30 when the ribbon cable 14 is placed on the cable organizer 46. Additionally, in some embodiments, as shown in FIGS. 3, 4, and 7, the cable organizer 46 can include an angled surface 126 between each end surface 114 and the flat surface 110. As further described below, the angled surfaces 126 can help guide a cable 14 into position into the grooves 120 of the flat surface 110 when the cover 48 is closed onto the housing 40. The cable organizer 46 also includes a plurality of apertures 124 extending through one or more of the longitudinal grooves 120 and configured to axially align with the conductor contacts 52, as further described below.

To further facilitate ribbon cable installation, the cable organizer 46 can be moveable in an axial direction within the housing 40, for example, along an axis 134 (as shown in FIG. 4). In some embodiments, the cable organizer 46 can be moved between a first position when the connector 30 is in a preassembled state (as shown in FIGS. 4 and 7) and a second, lower position when the connector 30 is in an assembled state. For example, in some embodiments, as shown in FIG. 3, the housing 40 can include one or more upper slots 136 extending through the first and second ends 66, 68, and one or more lower slots 138 extending through the first and second ends 66, 68 and positioned a distance below the upper slots 136. The lower detents 112 of the cable organizer 46 can be configured to engage or snap into the slots 136, 138 of the housing 40 to lock the cable organizer 46 in the first position (e.g., preassembled state) and the second position (e.g., assembled state), respectively.

More specifically, in the preassembled state, the lower detents 112 can each engage a respective upper slot 136 of the housing 40. In this position, as shown in FIG. 4, the raised end surfaces 114 of the cable organizer 46 can generally align with or extend above upper edges of the guide walls 86 or 92 (thus placing the cable organizer 46 within, or extending across, the open top 50) and the inverse ribbon profile 122 of the cable organizer 46 can be positioned above the inverse ribbon profiles 82 of the housing 40. Additionally, in the preassembled state, the cable organizer 46 is spaced a first distance above the printed circuit board 44 so that the conductor contacts 52 do not extend through the apertures 124 of the cable organizer 46.

In the assembled state, the cable organizer 46 can be pressed axially downward along the axis 134 into the housing 40 so that the lower detents 112 disengage the upper slots 136 and slide down the interior 96 of the housing 40 until they each engage (e.g., snap into) a respective lower slot 138. In this position, the inverse ribbon profile 122 of the cable organizer 46 can align with the inverse ribbon profiles 82 of the housing 40. Additionally, in the assembled state, the cable organizer 46 is spaced a second distance above the printed circuit board 44 so that the conductor contacts 52 extend through the apertures 124 and, as a result, can engage the individual conductors 22 of the ribbon cable 14 received within the longitudinal grooves 120. Additionally, as shown in FIG. 3, in some embodiments, the node connector 34 can incorporate a cutter 139 configured to sever a specific cable conductor 22 when the connector 30 is installed.

Figure 6:
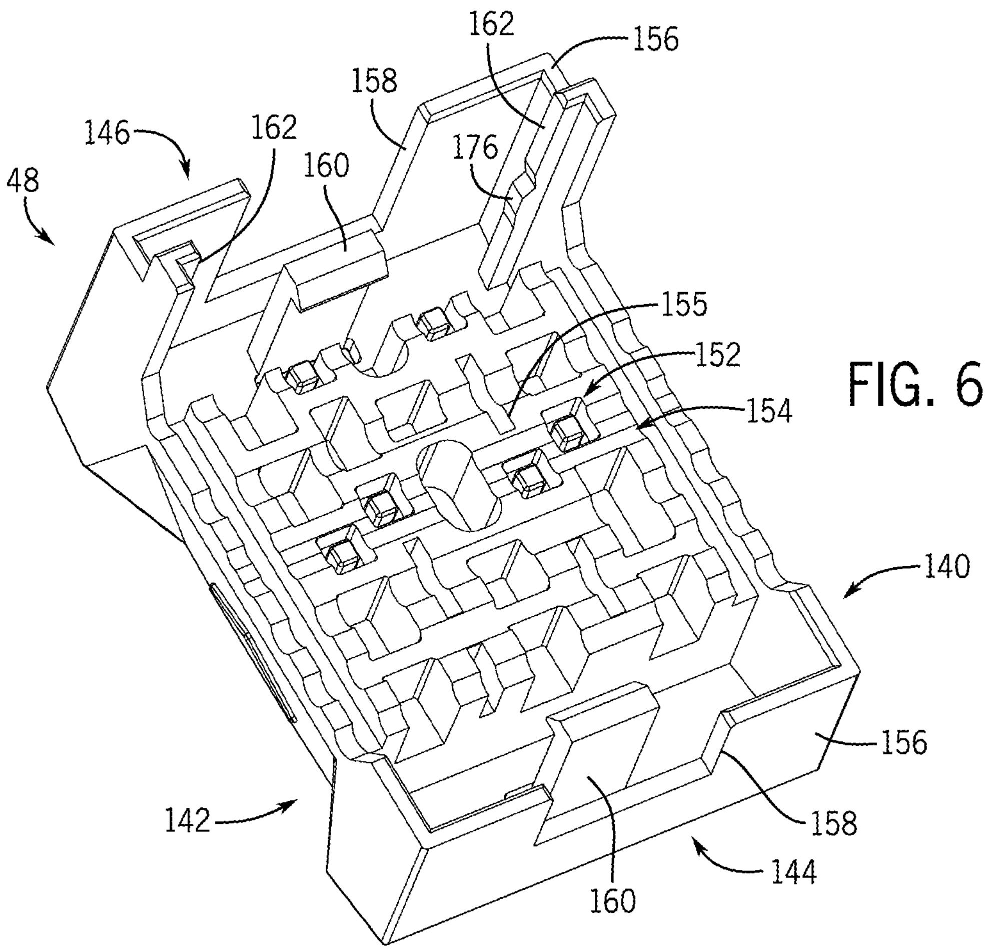
FIG. 6 is a perspective underside view of a cover of the node connector of FIG. 2

Generally, the cable organizer 46 can be enclosed within the housing 40 by the cover 48. In some embodiments, as shown in FIGS. 2-6, the cover 48 can be generally rectangular in shape and include a first side 140, a second side 142, a first end 144, and a second end 146. The cover 48 can also include an upper surface 148 and a bottom surface 152. The bottom surface 152 of the cover 48 can include an inverse cable profile 154 extending from the first side 140 to the second side 142 (e.g., corresponding to the ribbon profile 28 of a ribbon cable 14) and one or more apertures or indentations 155 that can generally align with the apertures 124 of the cable organizer 46, as shown in FIG. 6.

As shown in FIG. 6, the cover 48 can include outer walls 156 at the first and second ends 144, 146, which can extend around to the first and second sides 140, 142. Additionally, along the first and second ends 144, 146, each outer wall 156 can include a notch 158. The cover 48 can further include hooks 160 extending from the bottom surface 152 and positioned adjacent the first and second ends 144, 146, spaced inward from the respective notches 158. Furthermore, as shown in FIG. 6, the cover 48 can include internal ribs 162 on the first and second sides 140, 142 adjacent the second end 146. Each rib 162 can be sized to engage and slide along a respective track 94 of the housing 40, to support linear translation of the cover 48 relative to the housing 40, as further described below.

Regarding the upper surface 148 of the cover 48, in some embodiments, the upper surface 148 may be substantially flat. However, in other embodiments, the upper surface 148 can include a nonplanar surface profile. For example, the upper surface 148 may be beveled, created by angled indentations on the first and second sides 140, 142. In another example, as shown in FIGS. 2-4, the upper surface 148 includes a bump 164 generally extending from the first side 140 to the second side 142. The bump 164 may be a gradual bump, as shown in FIGS. 2-4, or may be a discrete bump and/or may include a rounded, square, triangular, or other profile that generally extends from the first side 140 to the second side 142 and peaks adjacent a center of the cover 48 (e.g., equidistant from the first end 144 and the second end 146). The central peak of the bump 164 can serve as contact point for tooling used to assemble the connector 30, as described below.

Figure 8:
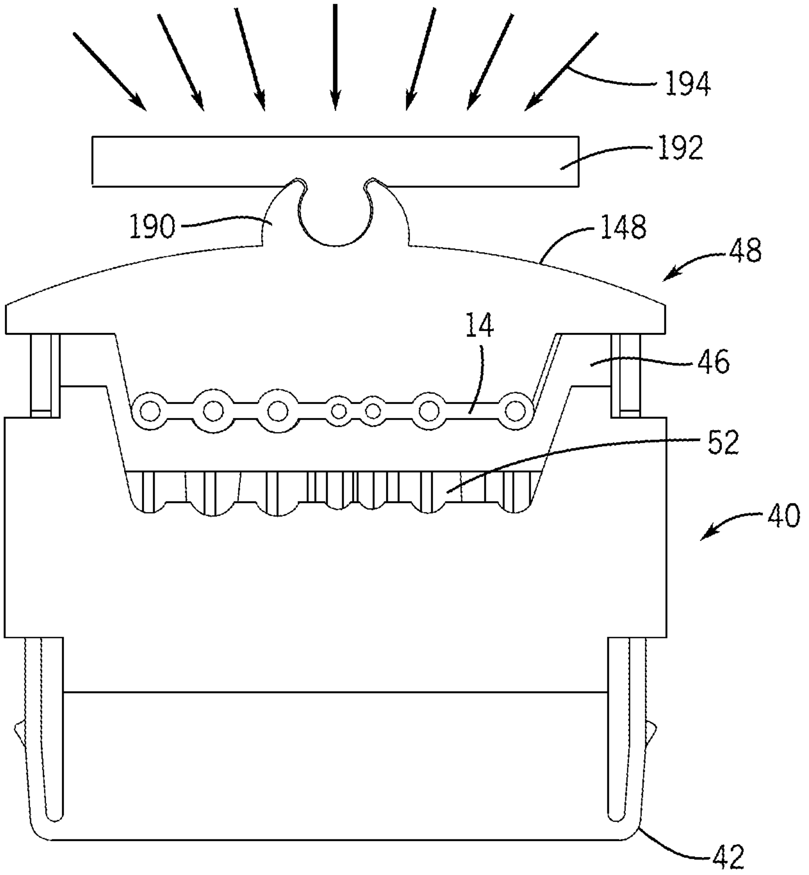
FIG. 8 is a side view of a node connector, according to some embodiments.

In further embodiments, as shown in FIG. 8, the upper surface 148 may include an inverted central bump 190 or other profile configured to receive or engage a separate flat plate 192, which may then serve as the contact surface for associated tooling. More specifically, in some embodiments, a profiled upper surface 148 may be part of an assembly including a separate pivoting plate 192 that engages the upper surface 148. The pivoting plate 192 can interface to a clamping tool (as discussed below) for more efficient load transfer with reduced friction and/or linear slipping during clamping. While the resultant force from clamping tool jaws can generate many different magnitudes and directions (illustrated by arrows 194 in FIG. 8), which deviate from the final desired direction of movement of the cover 48, the assembly can help redirect the force in the desired direction of movement.

Additionally, in some embodiments, as shown in FIGS. 2-5, the upper surface 148 of the cover 48 can include one or more features 170 that provide information to a user, for example, when the connector 30 is in the assembled or preassembled state. In one example, the feature 170 may be a horizontal line and/or one or more arrows, such as an indented or protruding line and arrows formed in the upper surface 148, or a colored line and arrows applied (e.g., painted on, printed on, etched on, etc.) to the upper surface 148. The line 170 can align with a cable orientation strip 128 along the cable 14 (as shown in FIG. 5) and/or a cable orientation strip (not shown) along the cable organizer 46 to further assist proper positioning of a ribbon cable 14 in the connector 30, while the arrows 170 can indicate ribbon cable direction out of the connector 30. Other features 170 not specifically described herein, such as arrows, tabs, or others, may be included within the scope of this disclosure to provide information to the user. Furthermore, in some embodiments, as shown in FIGS. 2, 3, and 5, the upper surface 148 can include slots 178, for example, configured to receive a label tag (not shown).

When in the assembled state, the cover 48 can cover the open top 50 of the housing 40 to capture and entrap the ribbon cable 14 within the housing 40 between the cover 48 and the cable organizer 46. That is, the ribbon cable 14 can be held between the lower inverse cable profile 122 of the cable organizer 46 and the inverse cable profile 154 of the bottom surface 152 of the cover 48, thereby preventing vertical and/or horizontal movement of the ribbon cable 14 within the connector 30 to facilitate secured connections between the cable conductors 22 and the conductor contacts 52. For example, as shown in FIGS. 2 and 5, the first side 140, the second side 142, the first end 144, and the second end 146 of the cover 48 can generally align with the first side 62, the second side 64, the first end 66, and the second end 68, respectively, of the housing 40. The outer walls 156 of the cover 48 can also rest upon the shoulders 88 of the housing 40, and the end notches 158 in the cover 48 can align with the knobs 84, 90 of the housing 40, as shown in FIGS. 2 and 3. Furthermore, the internal hooks 160 of the cover 48 can snap onto the first and second ends 106, 108 of the cable organizer 46, thus securing the cover 48 to the cable organizer 46. As the cable organizer 46 is secured to the housing 40 (that is, via the lower detents 112 engaged with the lower slots 138 of the housing 40), the cover 48 may be secured to the housing 40 at least via the cable organizer 46.

Additionally, in some embodiments, as shown in FIG. 4, the cover 48 can be coupled to, and also move relative to, the housing 40 via ribs 162 of the cover 48 engaging the tracks 94 of the housing. For example, as shown in FIGS. 3, 4, and 6, each track 94 can include an upper detent 172 and a lower detent 174, and each rib 162 can include a corresponding notch 176 configured to engage an upper detent 172 when in the preassembled state and a lower detent 174 when in the assembled state. Thus, the upper detent 172 and corresponding notch 176 can hold or fix the cover 48 relative to the housing 40 in the preassembled state, allowing a ribbon cable 14 to be inserted into the open top 50 of the housing 40. However, in some embodiments, the notches 176 and the upper detents 172 can be sized so that the cover 48 can be pulled off of the housing 40 with a sufficient amount of force.

Accordingly, the cover 48 can freely translate along the axis 134 in a first, upward direction, until reaching an upward-most position when the notches 176 reach the upper detents 172. And the cover 48 can freely translate in a second, downward direction until reaching a downward-most position when the notches 176 reach the lower detents 174. In other words, the cover 48 can translate linearly along the axis 134 a specified vertical distance between the upward-most position and the downward-most position, and can be held open in the upward-most position to facilitate insertion of the ribbon cable 14 into the open top 50.

The ribs 162 described above allows re-use of the cover 48 with a multiplicity of connectors (as further described below), thus creating several variant combinations which take advantage of the same, universal cover 48 for use with any housing 40 including tracks 94. As discussed above, in some embodiments, the cover 48 may be coupled to the housing 40 at all times, in both the preassembled and assembled states, therefore reducing the chances of losing components. However, in some embodiments, the cover 48 may be configured to be selectively uncoupled from the housing 40.

In some embodiments, the cover 48 and the cable organizer 46 can include additional features that help align the components during installation. For example, as shown in FIG. 9, the bottom surface 152 of the cover 48 and the cable organizer 46 can include mating guide ribs 180, 181 and apertures 182 that engage each other during installation. More specifically, the cover 48 can include pairs of guide ribs 180 adjacent both ends 144, 146. The cable organizer 46, along the first end 106 can include apertures 182 configured to receive the mating guide ribs 180. The cable organizer 46, along the second end 108 can include apertures 182 configured to receive the mating guide ribs 180 as well as further guide ribs 181 that slide adjacent (e.g., "scissor") the mating guide ribs 180 of the cover 48. In some cases, the mating guide ribs 180, 181 and apertures 182 can further help prevent potential misalignment of the connector 30 during installation.

While the connector described above with respect to FIGS. 2-7 is a node connector 30, one or more of the above-described components and features can be incorporated into other connectors in a network, such as the network 10 of FIG. 1. In some embodiments, unless specified otherwise below, any one or more of the above-described components of the node connector 30 can be incorporated into any one of a power tap left connector 32 (illustrated in FIGS. 10A and 10B), a power tap right connector, a terminator, and/or a splicer. Thus, in FIGS. 10A and 10B, like numerals illustrate like components as described above with respect to the node connector 30 of FIGS. 2-7 may be incorporated in the power tap left connector 32. And, while any of the above-described features of the like components of the node connector 30 can be incorporated into any one of the power tap left connector 32, the power tap right connector, the terminator, and/or the splicer in some embodiments, such features will not be described in detail again below for the sake of brevity.

For example, as shown in FIGS. 10A and 10B, the power tap left connector 32 can include a housing 40, a protection cap, a printed circuit board 44, a cable organizer 46, and a cover 48. As described above, the node connector 30 is configured to be coupled to a ribbon cable 14 so that the ribbon cable 14 extends out from the first and second sides 62, 64. However, in the power tap left connector 32, a cut end of a ribbon cable 14 can be adjacent the first, or left, side 62 thereof, and the ribbon cable extends out of the connector 32 from the second, or right, side 64 thereof.

As such, with respect to the housing 40, the first side 62 may not include a lowered edge with a profile 82, as described above, but, rather, may include a raised or straight edge extending from the first end 66 to the second end 68. Additionally, with respect to the cover 48, the inverse cable profile 154 may stop short of the first side 140, in that the outer cover wall 156 defines an extended edge 150 extending entirely across the first side 140. As a result, the straight edges prevent a ribbon cable 14 from extending out from the first side of the connector 32.

Furthermore, in some embodiments, the cable organizer 46 can include additional apertures 124 so as to accommodate multiple patterns of conductor contacts 52 to be used in any one of the node connector 30, the power tap left connector 32, the power tap right connector, the terminator, and/or the splicer. As such, the cable organizer 46 can be a universal cable organizer 46 for use in any type of connector. However, in other embodiments, the cable organizer 46 can include apertures 124 specific only to one, two, or more types of connectors.

Accordingly, in some embodiments, the covers 48 of the node connector 30 and the power tap left connector 32 may be different in that the power tap left connector cover 48 includes the extended edge 150 along the first side 140. In some embodiments, covers 48 may also differ with respect to placement of the features 170. For example, while the feature 170 shown in FIGS. 2-5 is depicted as a line extending across the entire cover 48, the feature shown in FIGS. 10A and 10B is depicted as an indent that extends only to the second side 142 (e.g., indicating a power or ribbon cable direction). However, in some embodiments, the cover 48 may be manufactured without such components. For example, the cover 48 may not include the components, or the components can be applied to the cover 48 after manufacture based on its use with a desired connector. As such, in some embodiments, a universal cover 48 can be manufactured, applicable or adaptable to any type of connector within the network.

Furthermore, in some embodiments, the cover 48 of the power tap left connector 32 can include a window 184 along the first side 140, serving as an indicator for different stages of the installation process. For example, as shown in FIG. 10B, in the preassembled state, the window 184 can act as a view port to assist with positioning of the ribbon cable 14 within the connector 32. On the other hand, as shown in FIG. 10A, the window 184 can act as an indicator that the connector 32 is in the assembled state when the raised edge of the housing 40 is viewable through the window 184.

Turning now to a power tap right connector (not shown), in some embodiments, a power tap right connector can include a housing 40, a protection cap, a printed circuit board 44, a cable organizer 46, and a cover 48. However, the power tap right connector can generally be a mirror image of the power tap left connector 32. More specifically, in the power tap left connector 32, as described above, a cut end of a ribbon cable 14 is adjacent the first, or left, side 62 thereof, and the ribbon cable extends out of the connector from the second, or right, 64 side thereof. However, in the power tap right connector, a cut end of a ribbon cable 14 is adjacent a second, or right, side 64 thereof, and the ribbon cable extends out of the connector from the first, or left, side 62 thereof.

As such, with respect to the housing 40, features on the first side 62 of the housing 40 of the power tap left connector 32 (such as the extended edge 150 with substantially straight profile) can be incorporated on the second side 64 of the housing 40 of the power tap right connector, and features on the second side 64 of the housing 40 of the power tap left connector 32 (such as the inverse ribbon profile 82) can be incorporated on the first side 62 of the housing 40 of the power tap right connector. Furthermore, in some embodiments, the printed circuit board 44 can include conductor contacts 52 in the same relative locations, so that the power tap right connector can engage the same conductors 22 as the power tap left connector 32.

Furthermore, in some embodiments, the another difference between the covers 48 of the power tap left connector 32 and the power tap right connector may be the placement of the features 170, such as being mirror images of each other. However, in some embodiments, the cover 48 may be manufactured without such components. For example, as discussed above, a universal cover 48 may not include the components, or the components can be applied to the cover 48 after manufacture based on its use with a desired connector.

Turning now to a terminator (not shown), in some embodiments, a terminator can include a housing 40, a cable organizer 46, and a cover 48. Like the power tap connectors 32, the terminator can include one side 62, 64 accommodating a cut end of a ribbon cable 14. However, unlike the power tap connectors 32 and the node connector 30, the terminator is not adapted to electrically or physically couple the ribbon cable 14 to a device in the network 10.

Thus, the terminator may not require certain features to accomplish such a device coupling. For example, in some embodiments, the housing 40 of the terminator can be substantially identical to the upper section 56 of the housing 40 of the power tap left connector 32 (e.g., including a similar width, length, and/or height as the upper section 56). However, rather than including a lower section 58 defining an open bottom 60, the terminator can include a rectangular housing with a closed bottom (e.g., the bottom seat 78 extends entirely across the bottom of the housing 40). Additionally, the cable organizer 46 of the terminator can be identical to the cable organizer 46 of the power tap connectors 32 and/or the node connector 30 (e.g., a universal cable organizer 46). However, in other embodiments, the cable organizer 46 can be specific only to the terminator, for example, without any apertures.

Also, the cover 48 of the terminator can be identical to the cover 48 of the power tap right connector (or the power tap left connecter 32). For example, when installed on the terminator, a cut end of a ribbon cable 14 can be adjacent a second, or right, side 64 thereof, and the ribbon cable 14 extends out of the terminator from the first, or left, side 62 thereof. That is, while no conductors 22 of the ribbon cable 14 are selectively severed by the terminator, the cut end of the ribbon cable 14 can be covered by the second side 64 of the housing 40, with the cover 48 providing a visual indication of such termination via a feature 170.

Referring now a splicer (not shown), according to some embodiments, the splicer can include a housing 40, a printed circuit board 44, two cable organizers 46, and two covers 48. Like the power tap connectors 32 and the terminator, the splicer can accommodate cut ends of two ribbon cables 14. Furthermore, unlike the power tap connectors 32 and the node connector 30, splicer may not be adapted to electrically or physically couple the ribbon cable 14 to a device in the network 10. Thus, the splicer may not require certain features to accomplish this coupling.

For example, in some embodiments, the housing 40 of the splicer can be substantially identical to upper sections 56 of the housings 40 of the power tap left connector 32 and the power tap right connector, coupled together side-by-side (e.g., equal in width and height as the connectors 32, but at least double the length). Thus, a first side 62 of the housing 40 can include an inverse ribbon profile 82, like the power tap right connector to receive a first ribbon cable 14, a second side 64 of the housing 40 can include an inverse ribbon profile 82, like the power tap left connector 32, to receive a second ribbon cable 14, and a central raised edge (not shown) can extend through a center of the housing 40, similar in function to the extended edges 150 of power tap connectors 32, to cover cut ends of the first and second ribbon cables 14. The central raised edge can be a separate component coupled to the housing 40, or can be integral with the housing in some embodiments.

In some embodiments, the central raise edge does not extend through an entire depth of the housing 40, so that the interior space 96 can be defined within the housing 40, extending from the first side 62 to the second side 64 thereof. The splicer can include a printed circuit board 44 that generally extends across the interior space 96, with two sets of conductor contacts 52 configured to contact individual conductors of the first and second ribbon cables 14, respectively. The printed circuit board 44 can further include traces that electrically couple the conductors of the first and second ribbon cables 14 together via the two sets of conductor contacts 52.

Additionally, the splicer can include two side-by-side cable organizers 46, for example, each identical to the cable organizer 46 of the power tap connectors 32, the node connector 30, and/or the terminator (e.g., a universal cable organizer 46). However, in other embodiments, the cable organizers 46 can be specific only to the splicer. Furthermore, as no electrical connections need to be made at to an external device, the interior space 96 of the housing 40 can accommodate the cable organizers 46 and a printed circuit board 44 without a socket receptacle. For example, rather than the housing 40 including lower sections 58 defining open bottoms 60, the splicer can include a rectangular housing with a closed bottom (e.g., the bottom seat 78 extends entirely across the bottom of the housing 40).

Also, the splicer can include two covers 48, for example, substantially identical to the covers 48 of the power tap left connector 32 and the power tap right connector coupled together to engage tracks 94 on both sides 62, 64 of the housing 40. In some embodiments, the central raised edge may also include a section adjacent the second end 68 with tracks 94 to receive internal ribs 162 of the covers 48. Accordingly, when installed on the splicer, a cut end of a first ribbon cable 14 is adjacent the central raised edge and extends out of the splicer from the first, or left, side 62 thereof, and a cut end of a second ribbon cable 14 is adjacent the central raised edge and extends out of the splicer from the second, or right, side 64 thereof. In light of the above description, while the splicer can include a larger housing 40 than the other connectors, the splicer can still incorporate the same covers 48 and/or cable organizers 46.

As all connectors described above can include similar parts, such as similar covers 48 and/or housings 40, a ribbon cable 14 can be installed on any connector using substantially the same method and/or the same tooling. For example, in some embodiments, a ribbon cable 14 can be installed on a desired connector using traditional tooling, such as conventional pliers. However, in other embodiments, specialty tooling specific to the connector may be used.

Thus, according to some embodiments, the following method can be executed to install a ribbon cable 14 on a connector. First, while the connector is in the preassembled state, the cover 48 can be linearly translated away from the housing 40 to create a cable access pathway 186, for example, as shown in FIG. 4. For example, in some embodiments, the cover 48 can be pulled away from the housing 40 so that the ribs 162 slide along the tracks 94 until the notches 176 reach the upper detents 172, thus maintaining the cover 48 away from the housing 40 in the preassembled state and creating the cable access pathway 186. While the cable access pathway 186 is shown in FIG. 4 as an opening adjacent the first end 66 of the housing 40, in some embodiments, a cable 14 may instead be inserted via the sides 62, 64 of the housing 40. Additionally, because the cover 48 remains coupled to the housing 40 in the preassembled state, the connector (and, more specifically, the guide walls 92 of the housing 40 and/or the outer walls 156 of the cover 48 along the second end 146) can "hang" on the ribbon cable 14 during installation at a desired location along the ribbon cable 14.

The ribbon cable 14 can then be inserted and positioned, via the cable access pathway 186, onto the cable organizer 46 so that the ribbon profile 28 of the ribbon cable 14 conforms to and aligns with the inverse ribbon profile 122 of the cable organizer 46. For example, the ribbon cable 14 can be inserted on the cable organizer 46 so that the respective strips 128 on the cable organizer 46 and the ribbon cable 14 can be aligned. In some embodiments, such alignment can be assisted by the angled surfaces 126 adjacent the flat surface 110 of the cable organizer 46, as further described below. In addition, in some embodiments, with respect to the power tap connectors 32, the terminator, and/or the splicer, a cut end of the ribbon cable 14 can be aligned adjacent the raised edge 150 or central raised edge of the housing 40.

Once the ribbon cable 14 is generally aligned, the cover 48 can be pressed linearly along the axis 134 toward the housing 40. That is, the cover 48 can be pressed toward the housing 40 so that the ribs 162 slide along the tracks 94 until the notches 176 reach the lower detents 174 to entrap the ribbon cable 14 within the housing 40 between the cover 48 and the cable organizer 46. As the cover 48 is being pressed toward the housing 40, the ribbon cable 14 can be more precisely aligned relative to the cable organizer 46 as it slides down the angled surfaces 126 toward the profiled surface 122. Thus, the angled surfaces 126 can act as cable guide ramps to guide the cable onto the profiled surface 122.

In some embodiments, a clamping tool, such as a pliers, can be used to press the cover 48 toward the housing 40 to move the connector from the preassembled state to the assembled state, as described above. That is, the tool can engage the upper surface 148 of the cover 48 (such as the bump 164) and a lower surface of the connector 30, 32. The lower surface can be, for example, the lower surface of the housing 40 (e.g., the lower section 58 of the housing 40 of the node connector 30, or the power tap connectors 32, or the enclosed bottom seat 78 of the terminator or the splicer). In some embodiments, to protect the open bottom 60 of the power tap connectors 32 and the node connector 30, the protection cap can first be placed over the lower section 58 of the housing 40 so that the tool can instead engage the protection cap.

Once engaged, the tool can be actuated to press the cover 48 toward the housing 40. In some embodiments, at the end of this movement, the applied compression forces can be distributed fully onto the housing 40. This clamping further completes termination of each conductor contact 52 onto the ribbon cable 14, thus electrically coupling the conductors 22 to the socket receptacle 100 in the power tap and node connectors 30, 32, and coupling the conductors 22 of adjacent ribbon cables 14 together in the splicer.

The tool can press the cover 48 toward the housing 40 with enough force to disengage the lower detents 112 of the cable organizer 46 from the upper slots 136 of the housing 40, moving the cable organizer 46 downward until the lower detents 112 snap into the lower slots 138 of the housing 40. Furthermore, the tool can press the cover 48 toward the housing 40 with enough force to disengage the notches 176 from the upper detents 172 until the notches 176 slide down the tracks 94 and engage the lower detents 174. These engagements can provide haptic feedback at the different stages of the cable termination process. Furthermore, the ribs 162 and the tracks 94 can permit a linear range of motion of the cover 48 irrespective of the direction or magnitude of applied forces by the tool against the connector 30, 32 from initial closing of the cover 48 until the cable termination. That is, while the cover 48 can move in a single directional line of motion, the input motion of the tool need not be in the same directional line of motion. As a result, proper connections between the connector 30, 32 and the ribbon cable 14 can be achieved with less precision during the clamping process, and using common tooling. For example, the profiled (e.g., nonplanar) upper surface 148 of the cover 48, as described above, can allow a clamping tool with varying placement positions, jaw opening angles, and force component vectors, to be used to primarily transmit a useful linear magnitude and direction of force to close the cover 48 and fully terminate a ribbon cable 14 in a desired linear manner. It should be noted that, while the profiled upper surface 148 is discussed herein with respect to the linear, sliding connector design, it may also be applicable to hinged, floating hinge, or multi-degree of freedom connector designs of some embodiments.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A connector for receiving a ribbon cable, the connector comprising:
- a housing including a first side, a second side, a first end, and a second end collectively defining an open top therebetween, a bottom opposite the open top, and a guide wall including a track;
- a cable organizer configured to be positioned within an interior of the housing and the open top and to receive the ribbon cable along a surface thereof;
- a cover configured to selectively cover the open top of the housing to enclose the cable organizer within the interior of the housing, the cover including a rib configured to slide along the track so that the cover moves relative to the housing along a linear trajectory; and
- a protection cap configured to cover the bottom of the housing,
- wherein the track includes an upper detent, and wherein the rib includes a notch configured to engage the upper detent during linear translation of the cover relative to the housing to a preassembled state, and
- wherein the track further includes a lower detent spaced a distance away from the upper detent, and wherein the notch of the rib is configured to engage the lower detent during linear movement of the cover relative to the housing to an assembled state.

2. The connector of claim 1, wherein the guide wall includes a plurality guide walls, and the track includes a first track positioned along a first side of the housing a second track positioned along a second side of the housing.

3. The connector of claim 1, wherein the rib includes a first internal rib positioned along a first side of the cover and a second internal rib positioned along a second side of the cover.

4. The connector of claim 1, wherein the cover is fixed relative to the housing in the preassembled state when the notch engages the upper detent.

5. The connector of claim 1, wherein the cover includes a nonplanar upper surface.

6. The connector of claim 1, wherein the cable organizer includes a lower detent that extends downward relative to the surface, the lower detent configured to snap into a slot of the housing.

7. The connector of claim 6, wherein the slot of the housing includes an upper slot and a lower slot positioned below the upper slot, wherein the lower detent is configured to snap into the upper slot to lock the cable organizer in a preassembled state, and the lower detent is configured to snap into the lower slot to lock the cable organizer in an assembled state.

8. A connector for receiving a ribbon cable, to be assembled via a clamping tool, the connector comprising:
- a housing including an open top and a bottom; and
- a cover configured to selectively cover the open top of the housing to enclose the ribbon cable within an interior of the housing, the cover including:
  - a first side and a second side, wherein the ribbon cable extends from the first side to the second side when the ribbon cable is enclosed within the interior of the housing,
  - a first end and a second end, and
  - a nonplanar upper surface including a bump that peaks between the first end and the second end,
  - wherein the clamping tool contacts the bump to force the cover toward the housing when the connector is assembled,
  - wherein the bump is an inverted bump, and further comprising a plate configured to engage the inverted bump, wherein the clamping tool contacts the inverted bump via the plate to force the cover toward the housing when the connector is assembled.

9. The connector of claim 8, wherein the clamping tool further contacts the bottom of the housing to force the cover toward the housing when the connector is assembled.

10. The connector of claim 8 and further comprising a protection cap configured to cover the bottom of the housing, wherein the clamping tool further contacts the protection cap to force the cover toward the housing when the connector is assembled.

11. The connector of claim 8 and further comprising a cable organizer configured to be positioned within an interior of the housing and the open top and to receive the ribbon cable, wherein the cable organizer includes a profiled surface between raised ends, the profiled surface configured to receive the ribbon cable.

12. The connector of claim 11, wherein the cable organizer further includes angled surfaces that transition from the raised ends to the profiled surface.

13. The connector of claim 11, wherein the profiled surface includes a plurality of longitudinal grooves extending from a first side to a second side thereof, the plurality of longitudinal grooves configured to align with individual conductors of the ribbon cable when the ribbon cable is received by the cable organizer.

14. A method of installing a ribbon cable on a connector, the method comprising:
- linearly sliding a cover of the connector away from a housing of the connector to create a cable access pathway to an open top of the housing while the cover and the housing remain engaged, the cable access pathway defined as a space between the cover and a first side wall, a second side wall, and a first end wall of the housing, wherein sliding the cover away the housing includes sliding the cover away the housing so that a rib of the cover slides along a track of the housing until a notch in the rib engages an upper detent of the track;

aligning the ribbon cable on a cable organizer positioned within the open top of the housing; and linearly sliding the cover toward the housing to entrap the ribbon cable within the housing between the cover and the cable organizer, wherein sliding the cover toward the housing includes pressing the cover toward the housing so that the rib of the cover slides along the track of the housing until the notch in the rib engages a lower detent of the track positioned below the upper detent.

15. The method of claim 14, wherein linearly sliding the cover toward the housing includes applying force against an upper surface of the cover and a bottom of the housing with a clamping tool, and further comprising contacting a bump along with upper surface with the clamping tool to apply the force against the upper surface of the cover.

* * * * *